United States Patent
Brettschneider et al.

(10) Patent No.: US 10,934,849 B2
(45) Date of Patent: Mar. 2, 2021

(54) ENDWALL CONTOURING FOR A TURBOMACHINE

(71) Applicant: MTU Aero Engines AG, Munich (DE)

(72) Inventors: Markus Brettschneider, Karlsfeld (DE); Inga Mahle, Munich (DE); Fadi Maatouk, Munich (DE)

(73) Assignee: MTU Aero Engines AG, Munich (DE)

( * ) Notice: Subject to any disclaimer, the term of this patent is extended or adjusted under 35 U.S.C. 154(b) by 185 days.

(21) Appl. No.: 15/978,644

(22) Filed: May 14, 2018

(65) Prior Publication Data

US 2018/0328184 A1 Nov. 15, 2018

(30) Foreign Application Priority Data

May 15, 2017 (EP) .................................... 17171141

(51) Int. Cl.
  *F01D 5/14* (2006.01)
  *F01D 9/04* (2006.01)

(52) U.S. Cl.
  CPC ............. *F01D 5/142* (2013.01); *F01D 5/143* (2013.01); *F01D 9/041* (2013.01); *F01D 5/145* (2013.01); *F05D 2220/32* (2013.01)

(58) Field of Classification Search
  CPC .......... F01D 5/142; F01D 5/143; F01D 5/145; F01D 9/041
  See application file for complete search history.

(56) References Cited

U.S. PATENT DOCUMENTS

| 4,420,288 | A | * | 12/1983 | Bischoff | F01D 5/145 416/244 A |
| 8,439,643 | B2 | * | 5/2013 | Kuhne | F01D 5/143 416/193 A |
| 8,721,291 | B2 | * | 5/2014 | Lee | F01D 5/081 416/193 A |
| 8,807,930 | B2 | * | 8/2014 | Green | F01D 5/143 415/191 |
| 8,864,452 | B2 | * | 10/2014 | Tham | F01D 5/143 415/173.7 |
| 8,884,182 | B2 | | 11/2014 | Lee et al. | |
| 8,985,957 | B2 | * | 3/2015 | Mahle | F01D 5/143 416/193 A |
| 9,200,638 | B2 | * | 12/2015 | Boston | F01D 5/143 |

(Continued)

FOREIGN PATENT DOCUMENTS

EP 2241723 A1 10/2010
EP 2589752 A2 5/2013
(Continued)

*Primary Examiner* — Brian P Wolcott
*Assistant Examiner* — Behnoush Haghighian
(74) *Attorney, Agent, or Firm* — Davidson, Davidson & Kappel, LLC

(57) ABSTRACT

Described are an airfoil array segment (100, 200, 300) having at least two airfoils (20, 30) and a platform (10) that features an axis asymmetrical platform surface (12). This platform surface features an elevation (110, 210, 310) that extends from the pressure side (21) of the first to the suction side (32) of the second airfoil (30). A highest point (111, 211, 311) of the elevation is more proximate to the suction side 32 of the second airfoil (30) than to the pressure side (21) of the first airfoil (20). Also described are an airfoil, a platform, an airfoil passage and a turbomachine.

20 Claims, 2 Drawing Sheets

(56) References Cited

U.S. PATENT DOCUMENTS

| | | | | |
|---|---|---|---|---|
| 9,453,415 B2 * | 9/2016 | Engel | ................... | F01D 5/12 |
| 9,551,226 B2 * | 1/2017 | Smith | ................... | F01D 5/143 |
| 2010/0284818 A1 * | 11/2010 | Sakamoto | ................... | F01D 5/143 |
| | | | | 416/241 R |
| 2013/0108433 A1 * | 5/2013 | Green | ................... | F01D 5/143 |
| | | | | 415/208.2 |
| 2014/0037453 A1 * | 2/2014 | Engel | ................... | F01D 5/12 |
| | | | | 416/204 R |
| 2014/0169977 A1 * | 6/2014 | Brettschneider | ................... | F01D 5/143 |
| | | | | 416/223 A |
| 2017/0089203 A1 * | 3/2017 | Lohaus | ................... | F01D 5/14 |
| 2017/0159444 A1 * | 6/2017 | Wolfrum | ................... | B63H 21/00 |

FOREIGN PATENT DOCUMENTS

| | | | |
|---|---|---|---|
| EP | 2787172 A2 | 10/2014 | |
| EP | 3064706 A1 | 9/2016 | |
| WO | WO2011039352 A2 | 4/2011 | |
| WO | WO2013009449 A | 1/2013 | |

* cited by examiner

ENDWALL CONTOURING FOR A TURBOMACHINE

This claims the benefit of European Patent Application EP17171141.9, filed May 15, 2017 and hereby incorporated by reference herein.

The present invention relates to an airfoil array segment, an airfoil array, a platform, and to an airfoil passage of a turbomachine, as well as to a turbomachine.

BACKGROUND

Turbomachines (such as gas and steam turbines) routinely have an airflow passage to allow a fluid to pass therethrough. The airflow passage, also referred to as "annular space," is radially inwardly bounded by a radially inner endwall, which can be formed, for example, by radially inner rotor blade platforms or by radially inner stator vane platforms, and is configured on the hub side, and, radially outwardly by a radially outer endwall, for example, which can be formed by radially outer rotor blade platforms (also referred to as "shroud") or by radially outer stator vane platforms, and is configured on the housing side; unless indicated otherwise, the designations "radial," as well as "axial" and "circumferential," and terms derived therefrom are to be understood herein with reference to an axis of rotation of the rotor.

Airfoil arrays (also commonly referred to as "vane rings" and "blade rings") are configured in the annular space of a turbomachine. They include stator vanes or rotor blades, respectively, that are successively circumferentially disposed, essentially spaced at regular intervals, as well as associated platforms, which, in the case of rotor blades, are also referred to as "shrouds" and generally have a leading and a trailing platform edge. These platform edges axially delimit the platform surface; the term "platform surface" used herein refers to the surface of the platform that faces the annular space.

The platform edge first passed over by the (axial) primary flow that is directed during operation through the annular space of the turbomachine, is referred to herein as the "leading" platform edge; correspondingly, the opposite edge is referred to as the "trailing" platform edge. In correspondence therewith, the designations "downstream" and "upstream" refer to the axial primary flow direction, and, more specifically, only to the axial position, thus regardless of any possible shift in the circumferential or radial direction. A point is understood herein namely as located "downstream of the leading edges" when it is axially offset from a direct connection of the leading edges (to one another) on the platform surface in the primary flow direction (thus, following the same). This holds analogously for the designation "upstream" (in the opposite direction).

The section of the platform surface that is axially bounded by the direct connections (thus, extending circumferentially without any axial deviations) between the leading and trailing edges of the adjacent airfoils on the platform surface and circumferentially by the pressure side of one airfoil and the suction side of the other is referred to herein as "inter-airfoil strip." The circumferential extent of the inter-airfoil strip at the leading edges is referred to as "pitch spacing" (of the airfoil array, an airfoil array segment, or of the airfoils). It can be measured, namely, as the circumferential distance between the leading edges of adjacent airfoils in the platform surface region. The distance between the leading and trailing edges of the airfoils measured (only) in the axial direction (in the direction of the designated axial primary flow) is termed (axial) "chord length."

The pressure side of an airfoil and the suction side of an adjacent airfoil circumferentially bound what is generally referred to as an airfoil passage. Within the turbomachine, this airfoil passage is radially bounded by radially inner and radially outer endwalls. In the case of rotor blades, the endwalls are formed by opposite rotor blade platforms; in the case of stator vanes, they are formed by a housing-side, radially outer stator vane platform and an opposite, hub-side, radially inner platform of the stator vane(s) or a radially inner platform of another stator part.

The surfaces of the endwalls constantly influence a fluid flow passing through an airflow passage. Due to the lower velocity thereof, flow layers proximal to these surfaces are deflected to a greater degree than flow layers more distal to the endwalls. This creates a secondary flow that is superimposed on an axial primary flow and, in particular, leads to vortices and pressure losses.

To reduce the secondary flows, the endwalls are often provided with contours in the form of elevations and/or depressions.

A multiplicity of such contours, commonly known as "endwall contours," are known from the related art. In particular, the platforms can be axis asymmetrical (also referred to as "nonaxisymmetric" or "non-axially symmetric"): this means that (in comparison to a zero level), the height of the platform surface varies along at least one path (or line) that extends purely circumferentially between the airfoils.

U.S. Pat. No. 8,439,643 B2, for example, describes contouring a platform, where each pressure side of a first airfoil and suction side of a second airfoil are provided with an elevation and a depression. The depressions are thereby joined by a saddle, and the elevations are disposed on different sides of the saddle.

The European Patent Application EP 3,064,706 A1 describes a stator vane row for an axial flow turbomachine that has differently configured axis-asymmetrical airfoil passages.

U.S. Pat. No. 8,884,182 B2 discusses a method for adapting an endwall contouring by using a laser to create a weld pool, subsequent application of the method to an already mounted platform and blades being possible, or even to already used rotors.

SUMMARY OF THE INVENTION

It is an object of the present invention to provide a technique that will make it possible to advantageously further reduce secondary flows in the annular space of a turbomachine.

The objective is achieved by an airfoil array segment, an airfoil array, an airfoil passage, a platform, and by a turbomachine. Advantageous specific embodiments are described in the description, and the figures.

An inventive airfoil array segment for an airfoil array (for example, a rotor blade array or a stator vane array) of a turbomachine includes a platform having an axis-asymmetrical platform surface, as well as at least one first and one second airfoil (preferably adjacent to the first airfoil in the airfoil array). The airfoils each have a pressure side and a suction side, as well as a leading edge and a trailing edge.

The platform surface has an elevation that extends from the pressure side of the first airfoil to the suction side of the second airfoil, i.e., that is continuously through-extending from the mentioned pressure side to the mentioned suction side and contacts the mentioned sides. In the case of an inventive airfoil segment, at least one highest point of the elevation is thereby more proximate to the suction side of the second airfoil than to the pressure side of the first airfoil.

An "elevation" is understood herein to be a local formation (such as a boss or projection) of the platform surface where (in comparison to a platform surface of a non-contoured platform, which is understood herein as representing the "zero level") the platform surface extends radially in the same direction of projection of the airfoils from the platform. In the case of an elevation on a platform that radially outwardly bounds the annular space, an elevation thus extends radially inwardly; in the case of an elevation on a platform that radially inwardly bounds the annular space, an elevation extends radially outwardly.

A "depression" is understood (further below) to be analogous to a local formation of the platform surface in the opposite direction (for example, a trough or recess). In the case of an elevation on a platform that radially outwardly bounds the annular space, a depression thus extends radially outwardly; in the case of a depression on a platform that radially inwardly bounds the annular space, radially inwardly.

The designations "elevation" and "depression" (in the same way as terms such as "height," "depth" or the like) are thus based here on an orientation or a coordinate system where the airfoils and an elevation each extend "upwardly" from the platform surface. Accordingly, a depression extends "downwardly" in the opposite direction.

A highest or (further below in the text) lowest point of a line, elevation or depression is understood to be the furthest that each of these extend in the particular direction. The highest or lowest points of an elevation or depression may form a surface section or a curve in each particular case, or be singular. Accordingly, the highest or lowest points may form a line, a segment of the line, or be singular.

An exemplary embodiment provides that the elevation have exactly one highest point.

In one portion, a boundary line between the pressure side of the first airfoil and the platform surface may conform with a boundary of the elevation at the zero level (so that the elevation only contacts the pressure side there); and/or, in a (possibly existing other) portion, the boundary line may run on the elevation (so that the first airfoil is even rooted there to the elevation). A highest point of the mentioned boundary line (between the pressure side of the first airfoil and the platform surface) is preferably not as high as the highest point of the elevation.

Analogously, a boundary line between the suction side of the second airfoil and the platform surface may conform in at least one portion with a boundary of the elevation at the zero level (so that the elevation only contacts the suction side there); and/or, in a (possibly existing other portion), the boundary line may run on the elevation (so that the second airfoil is even rooted there to the elevation). A highest point of the mentioned boundary line (between the suction side of the second airfoil and the platform surface) is preferably not as high as the highest point of the elevation.

Specifically, the elevation may contact the pressure side of the first airfoil in an upstream half or even in a furthest upstream third of the inter-airfoil strip; or at least one portion of the first airfoil may be rooted to the elevation in the upstream half or even in the furthest upstream third of the inter-airfoil strip.

In an advantageous embodiment of the present invention, the elevation decreases from the highest point at least in one (specific) portion in the circumferential direction toward the pressure side of the first airfoil and/or toward the suction side of the second airfoil.

An airfoil array segment according to the present invention may be one-piece (i.e., single-piece) or multipiece. Specifically, the platform may be one-piece or include two or more pieces, from which one of the airfoils may project, or the platform may be formed at least as a separate component that is or may be configured between the airfoils; more specifically, the elevation of the platform surface may optionally extend over two or more parts of the platform. Accordingly, a platform according to the present invention is adapted to circumferentially adjoin an airfoil on each side and, together with the airfoils (of which none, one or both may be integrally formed on the platform), forms an inventive airfoil array segment in accordance with one of the specific embodiments described in this document. A multi-part formation of the airfoil array segment (or of the platform thereof) may be especially advantageous when the relevant airfoil array is a rotor blade array.

By the leading platform edge thereof, the platform may be adapted to be used (at least substantially) adjacently to a further (separate) element (for example, the hub or the housing of another airfoil array) in the turbomachine. The leading platform edge may be adapted for forming a wall portion of a gap through which the cooling fluid is or may be introduced into the annular space of the turbomachine.

An airfoil array according to the present invention includes at least one inventive airfoil array segment according to one of the specific embodiments described herein. A turbomachine according to the present invention (for example, an aircraft engine) includes one or a plurality of airfoil arrays according to the present invention.

An airfoil passage according to the present invention leads through an airfoil array segment according to the present invention in accordance with one of the specific embodiments described herein, thus is bounded by such an airfoil array segment, as well as by an endwall opposite the platform thereof (facing the platform surface). An airfoil passage according to the present invention is circumferentially bounded by the pressure side of the first airfoil and by the suction side of the opposite (adjacent) second airfoil.

The static pressure field present at the platform surface and acting upon the airfoils in the edge region is influenced by the inventive geometry of the platform surface provided by an airfoil array segment according to the present invention, an airfoil array according to the present invention, an airfoil passage according to the present invention, a platform according to the present invention, and a turbomachine according to the present invention. Secondary flow, especially vortices in the airfoil passage may be thereby reduced. This makes it possible to reduce losses and enhance the inflow into a further, possibly downstream airfoil array.

Specifically, the airfoil array segment, the airfoil array, the airfoil passage and the platform may be installed as part of a low-pressure or high-pressure turbine or be adapted to be used in a low-pressure or high-pressure turbine. The airfoils may be stator vanes or rotor blades. The platform may be adapted to radially inwardly or radially outwardly bound an airfoil passage extending through the airfoil array segment.

A preferred specific embodiment of the present invention provides that the highest point of the elevation be located within the inter-airfoil strip; relative to the circumferential direction, the highest point is then located in a half of the inter-airfoil strip that is disposed on the suction side of the second airfoil (determined by a mid-pitch). A variant is especially advantageous where a distance of the at least one highest point of the elevation from the pressure side of the first airfoil measured (only, without axial deviation) in the circumferential direction is at least twice as great or even three times as great as the distance of the highest point from the suction side of the second airfoil measured in the circumferential direction.

Relative to the axial direction, the highest point may preferably be located in a downstream half of the inter-airfoil strip. Specifically, an embodiment has proven to be advantageous whereby the at least one highest point is located at at least 50% and/or at most 70% of the axial chord length of the airfoil array segment downstream of the leading edges of the airfoils.

Preferably, an upstream elevation boundary located at the zero level extends from the pressure side or the leading edge of the first airfoil to the suction side or leading edge of the second airfoil; and/or a downstream elevation boundary disposed at the zero level extends from the pressure side or the trailing edge of the first airfoil to the suction side or the trailing edge of the second airfoil. The elevation may, in fact, be entirely configured in the inter-airfoil strip.

A specific embodiment is advantageous where a furthest upstream point of an upstream elevation boundary disposed at the zero level is located at at least 5% and/or at at least 10% of the axial chord length downstream of the leading edges; and/or where the mentioned point is located at at most 20% and/or at most 15% of the axial chord length downstream of the leading edges.

An embodiment of the present invention has proven to be especially advantageous where, in addition to the elevation, the platform surface has at least one depression that is configured in the entirety thereof (thus, at all points) upstream of at least a highest point of the elevation. It turns out that this enables the airfoil array to very advantageously influence the secondary flow.

Preferably, the depression contacts the suction side of the second airfoil, or the second airfoil is rooted in a portion of the suction side thereof, even in the depression.

Especially advantageous is a specific embodiment where the depression extends circumferentially by at most 60% or even, at most, by half of the pitch spacing of the airfoil array segment.

The depression may have a region that extends upstream of the leading edges of the airfoils (and thus also of the inter-airfoil strip).

Specifically, the depression may be spaced at a distance from the leading platform edge. For example, the platform surface may have a surface strip having a positive width (>0) that is disposed at the zero level at all of the points thereof and that runs along the leading platform edge over the complete pitch spacing.

Alternatively, the depression may extend all the way to the leading platform edge: In fact, a boundary line of the depression that is disposed at the zero level may run in a portion along the leading platform edge, or the leading platform edge may even cover the depression, thus, namely, (itself) feature a contour defined by the depression.

An advantageous embodiment provides that at least a lowest point of the depression be located at most at 5% of the axial chord length upstream or downstream of the leading edges of the airfoils, so that the axial position thereof deviates at most by 5% of the axial chord length from the axial position of the leading edges.

BRIEF DESCRIPTION OF THE DRAWINGS

Preferred exemplary embodiments of the present invention will be described in greater detail below with reference to the drawings. It is understood that individual elements and components may be combined in ways other than those described. Reference numerals for corresponding elements are used throughout the figures and, as the case may be, are not re-specified for each figure.

Schematically shown in.

DETAILED DESCRIPTION

Figure 1:
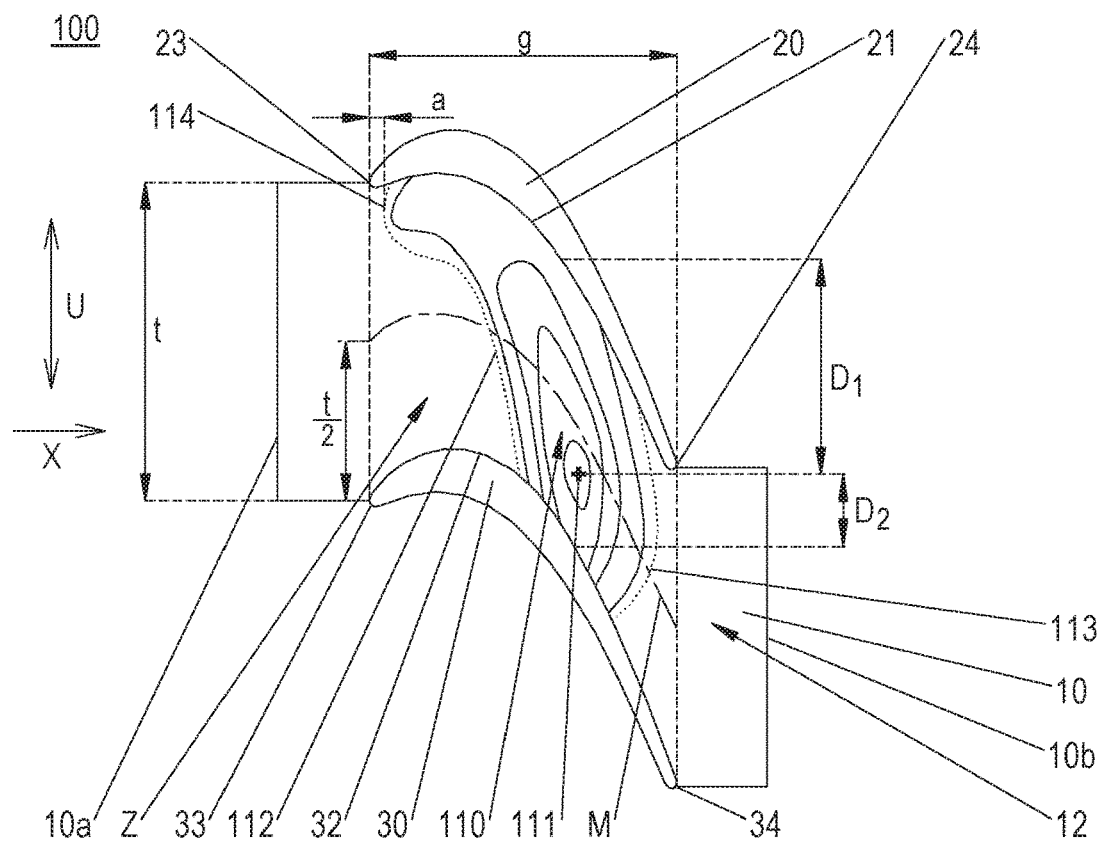
FIG. 1: is an airfoil array segment of a first exemplary embodiment of the present invention in a plan view.

In a plan view (in a radial direction of view), FIG. 1 schematically shows a developed, exemplary specific embodiment of an airfoil array segment 100 according to the present invention. It includes airfoils 20, 30, which each have a pressure side and a suction side, as well as an inventive platform 10 having a platform surface 12, a leading platform edge 10a and a trailing platform edge 10b (viewed relative to designated primary flow direction X). The platform may have a one-part or two-part form, for example. Specifically, it may include two parts from which one of airfoils 20, 30 projects, respectively.

The airfoils define an inter-airfoil strip Z as the surface section that is located in circumferential direction U between pressure side 21 of first airfoil 20 and suction side 32 of second airfoil 30 and that, in axial direction X, is bounded at the upstream end by a connection of leading edges 23, 33 of airfoils 20, 30 and at the downstream end by a connection of respective trailing edges 24, 34. The mentioned connections run on platform surface 12 only in circumferential direction U (thus, without deviating axially therefrom) and are spaced apart by a distance that corresponds to axial chord length g of the airfoil array segment. A pitch spacing t is defined as the distance between leading edges 23, 33 at the platform surface.

In inter-airfoil strip Z, platform surface 12 features an elevation 110, which is indicated in FIG. 1 by contour lines and extends from pressure side 21 of first airfoil 20 to suction side 32 of second airfoil 30. A highest point 111 of elevation 110 is located in FIG. 1 in a suction-side half of inter-airfoil strip Z characterized by a mid-pitch M (which marks the middle of the distance defined only in the circumferential direction between pressure side 21 of first airfoil 20 and suction side 32 of second airfoil 30); thus, highest point 111 is more proximate to suction side 32 of the second than to the pressure side of the first airfoil. In the present example, a purely circumferentially measured distance $D_1$ of highest point 111 from mentioned pressure side 21 is even more than twice as great as circumferentially measured distance $D_2$ to the mentioned suction side.

In the specific embodiment of FIG. 1, mentioned elevation 110 has exactly one highest point 111 that is a respective local absolute maximum.

In the exemplary embodiment shown in FIG. 1, an upstream boundary 112 and a downstream boundary 113 of elevation 110 each extend at the zero level from mentioned pressure side 21 to mentioned suction side 32. As is discernible from the contour lines, airfoils 20, 30 are each rooted therebetween to elevation 110. A highest point (not marked in the figure) of a boundary line disposed on elevation 110 between suction side 32 of second airfoil 30 and platform surface 12 is not as high as highest point 111 of the elevation and is higher than a highest point of a boundary line (likewise not marked) disposed on elevation 110 between pressure side 21 of first airfoil 20 and the platform surface. More specifically, platform surface 12 is configured to be axis asymmetrical.

A furthest upstream point 114 of upstream boundary 112 of elevation 110 has an axial position that is shifted relative to leading edges 23, 33 by distance a in axial primary flow direction X. In this context, $g/20 \leq a \leq g/5$, so that furthest upstream point 114, is situated, therefore, at at least 5% and at most 20% of axial chord length g downstream of leading edges 23, 33 of airfoils 20, 30.

In the illustrated example, point 114 is located in a pressure-side half of inter-airfoil strip Z (characterized by mid-pitch M).

Figure 2:
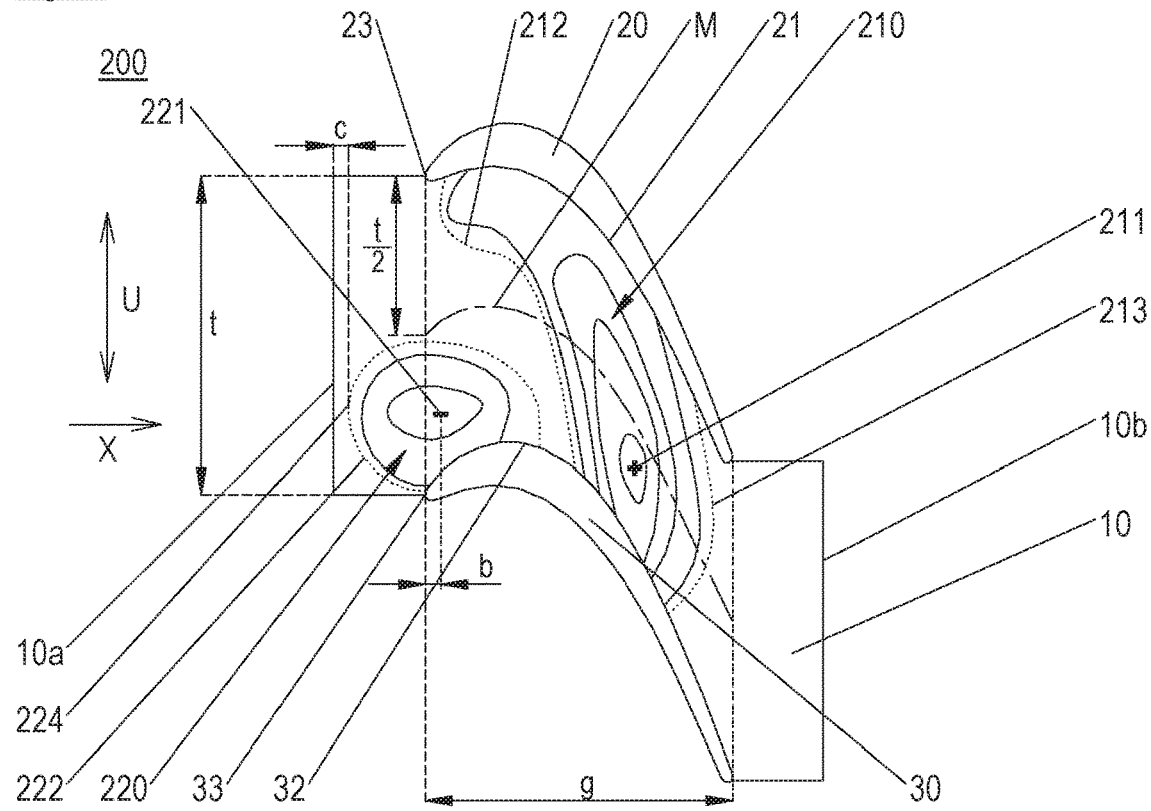
FIG. 2: is an airfoil array segment of a second exemplary embodiment of the present invention in a plan view.

FIG. 2 shows an alternative specific embodiment of a developed airfoil array segment 200 according to the present invention in a plan view (in a radial direction of view). As does airfoil array segment 100 shown in FIG. 1, it includes airfoils 20, 30 and a platform 10 according to the present invention having an axis asymmetrical platform surface 12.

The platform surface of airfoil array segment 200 illustrated in FIG. 2 has an elevation 210 that extends from pressure side 21 of first airfoil 20 to the suction side of second airfoil 30 having a highest point 211 that is more proximate to mentioned suction side 32 than to said pressure side 21. In the illustrated example, elevation 210 of exemplary airfoil array segment 200 according to the present invention shown in FIG. 2 is formed in the manner of elevation 110 illustrated in FIG. 1 and is, therefore, not described in further detail; it is understood that other embodiments are nevertheless possible in the context of the present invention.

Airfoil array segment 200 also features a depression 220 on platform surface 12. It is likewise characterized in FIG. 2 by contour lines, is entirely (by all of the points thereof) located upstream of highest point 211 of elevation 210, and reaches suction side 32 of second airfoil 30; in the illustrated example, a portion of second airfoil is even rooted at suction side 32 thereof in depression 220.

A lowest point 221 of depression 220 is in an axial position that is spaced by a distance b downstream of leading edges 23, 33. In this context, $b \leq g/20$, thus lowest point 221 is located no further than 5% of axial chord length g downstream of the leading edges.

Depression 220 has a boundary 222 at the zero level. Boundary 222 thereby extends from suction side 32 of second airfoil 30 into inter-airfoil strip and again to suction side 32. Boundary 222 and a portion of the boundary line between platform surface 12 and suction side 32 together surround depression 220; specifically, at the suction side thereof, second airfoil 30 is rooted in upstream third thereof to the depression in inter-airfoil strip Z.

A portion of depression 220 is located upstream of leading edges 23, 33 of airfoils 20, 30. In this instance, depression 220 is entirely disposed downstream of leading platform edge 10a. A furthest upstream point 224 of boundary 222 even has a positive distance c>0 (measured in axial direction X) from leading platform edge 10a.

Figure 3:
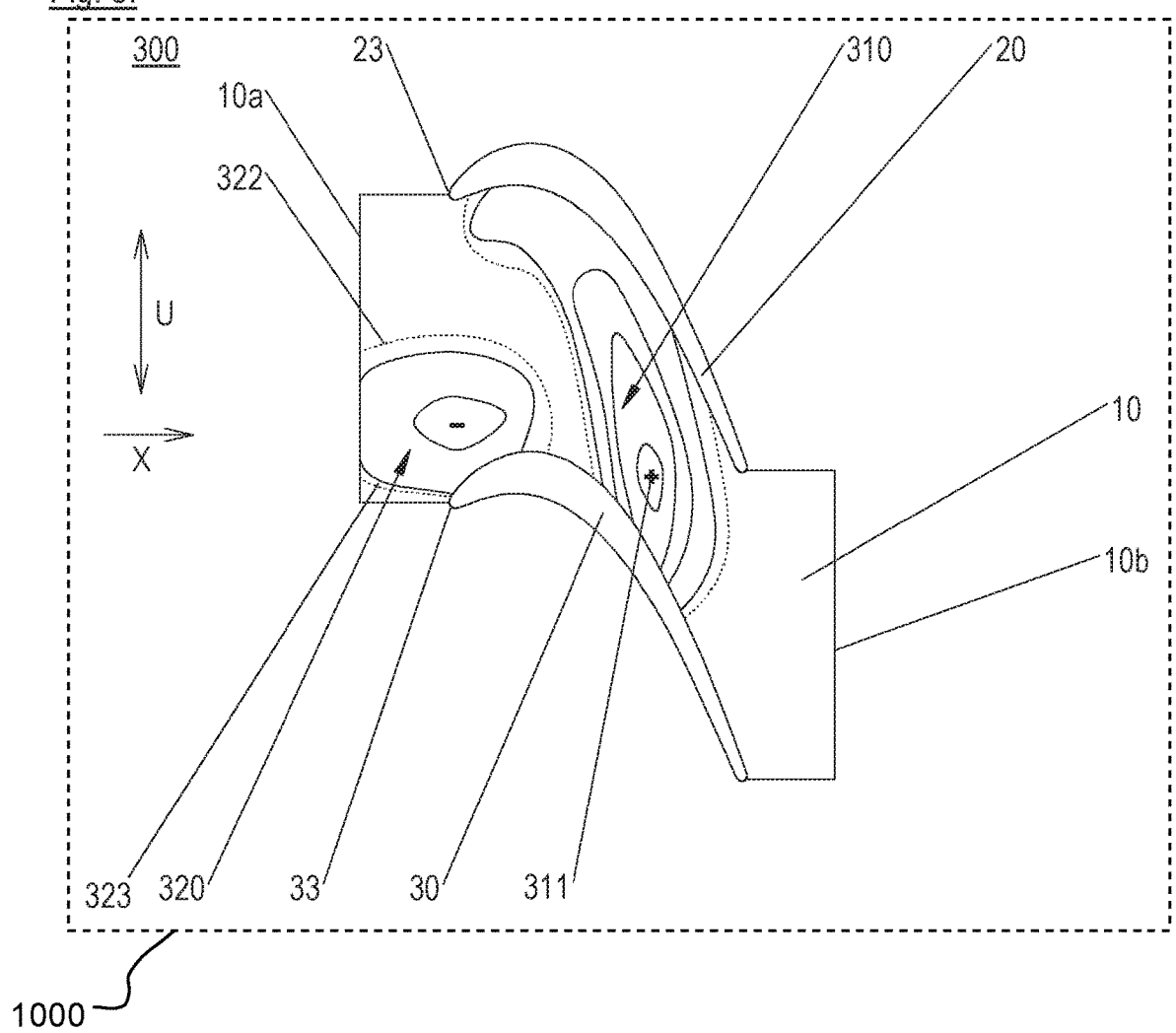
FIG. 3: is an airfoil array segment of a third exemplary design variant of the present invention in a plan view.

FIG. 3 shows another exemplary embodiment of an airfoil array segment 300 according to the present invention. As do airfoil array segments 100, 200 shown in FIGS. 1 and 2, airfoil array segment 300 includes two airfoils 20, 30 and a platform 10 according to the present invention having an axis asymmetrical platform surface that includes an inter-airfoil strip. This platform surface has an elevation 310 that extends from pressure side 21 of first airfoil 20 to the suction side of second airfoil 30 having a highest point 311 that is more proximate to mentioned suction side 32 than to said pressure side 21. In the illustrated example, elevation 310 of exemplary airfoil array segment 300 according to the present invention shown in FIG. 3 is formed in the manner of elevations 110, 210 illustrated in FIGS. 1 and 2, respectively, and is, therefore, not described in further detail; it is understood that other embodiments are nevertheless also possible in the context of the present invention.

In addition, platform surface 12 of airfoil array segment 300 also features a depression 320, which, in turn, is characterized in the figure by contour lines. Depression 320 is entirely located upstream of highest point 311 of elevation 310 and reaches suction side 32 of second airfoil 30; in the illustrated example, a portion of second airfoil is even rooted at suction side 32 thereof and at leading edge 33 thereof in depression 320.

Depression 320 extends to leading platform edge 10a and is even covered by the same: Boundaries 322, 323 of depression 320 at the zero level extend in each case from second airfoil 30 to leading platform edge 10a where they are spaced apart. Specifically, leading platform edge 10a features a contour that is defined by the depression.

Described are an airfoil array segment 100, 200, 300 having at least two airfoils 20, 30 and a platform 10 that features an axis asymmetrical platform surface 12. This platform surface features an elevation 110, 210, 310 that extends from pressure side 21 of the first to suction side 32 of second airfoil 30. A highest point 111, 211, 311 of the elevation is more proximate to suction side 32 of second airfoil 30 than to pressure side 21 of first airfoil 20. Also described are an airfoil, a platform, an airfoil passage and a turbomachine having a stator vane or rotor blade array with the airfoil array segment, shown schematically as 1000 in FIG. 3.

REFERENCE NUMERAL LIST

10 platform
10a leading platform edge
10b trailing platform edge
20, 30 airfoil
21 pressure side of first airfoil 20
23, 33 leading edge
24, 34 trailing edge
32 suction side of second airfoil 30
100, 200, 300 airfoil array segment
110, 210, 310 elevation
111, 211, 311 highest point of the elevation
112, 212 upstream boundary of the elevation at the zero level
113, 213 downstream boundary of the elevation at the zero level
114 furthest upstream point of boundary 112
112, 122, 142 highest point of the elevation
220, 320 depression
221 lowest point of the depression
222, 322, 323 boundary of the depression at the zero level
224 furthest upstream point of boundary 222
1000 turbomachine
a axial distance of point 114 from the leading edges
b axial distance of point 221 from the leading edges
c axial distance of point 224 from the leading platform edge 10a
g axial chord length
t pitch spacing
$D_1$ circumferentially measured distance of highest point 111 from the pressure side of the first airfoil $D_2$ circumferentially measured distance of highest point 111 from the suction side of the second airfoil
M mid-pitch
U circumferential direction
X designated axial primary flow direction
Z inter-airfoil strip

What is claimed is:

1. An airfoil array segment of an airfoil array for a turbomachine, the airfoil array segment comprising:
    a platform having an axis asymmetrical platform surface; and
    at least a first and a second airfoil;
    the platform surface having an elevation extending from a pressure side of the first airfoil to a suction side of the second airfoil, at least one highest point of the elevation being more proximate to the suction side of the second airfoil than to the pressure side of the first airfoil.

2. The airfoil array segment as recited in claim 1 wherein the at least one highest point is located at at least 50% and at most 70% of an axial chord length of the airfoil array segment downstream of leading edges of the first and second airfoils.

3. The airfoil array segment as recited in claim 1 wherein a first distance of the at least one highest point of the elevation from the pressure side of the first airfoil measured in a circumferential direction is at least twice as great as a second distance of the highest point from the suction side the second airfoil measured in the circumferential direction.

4. The airfoil array segment as recited in claim 1 wherein the first distance is at least three times as great as the second distance.

5. The airfoil array segment as recited in claim 1 wherein a furthest upstream point of an upstream boundary of the elevation is disposed at at least 5% or even at least 10% of an axial chord length downstream of leading edges of the first and second airfoils.

6. The airfoil array segment as recited in claim 5 wherein the furthest upstream point is disposed at at least 10% of the axial chord length downstream of leading edges of the first and second airfoils.

7. The airfoil array segment as recited in claim 1 wherein the platform surface also has a depression configured at least partially upstream of the at least one highest point of the elevation.

8. The airfoil array segment as recited in claim 7 wherein the depression is configured entirely upstream of the at least one highest point of the elevation.

9. The airfoil array segment as recited in claim 7 wherein the depression contacts the suction side of the second airfoil.

10. The airfoil array segment as recited in claim 7 wherein the depression has a region disposed upstream of the leading edges of the first and second airfoils.

11. The airfoil array segment as recited in claim 10 wherein the depression extends to a leading platform edge.

12. The airfoil array segment as recited in claim 10 wherein the depression is spaced at a distance from a leading platform edge.

13. The airfoil array segment as recited in claim 7 wherein a lowest point of the depression is located at most 5% of an axial chord length upstream or downstream of leading edges of the first and second airfoils.

14. The airfoil array segment as recited in claim 1 wherein the first and second airfoils are stator vanes or rotor blades.

15. An airfoil array for a turbomachine comprising the airfoil array segment as recited in claim 1.

16. An airfoil passage of a turbomachine comprising the airfoil array segment as recited in claim 1 and an endwall opposite the platform of the airfoil array segment, the airfoil passage bounded by the airfoil array segment and the endwall.

17. A turbomachine comprising the airfoil array as recited in claim 15.

18. The airfoil array segment as recited in claim 1 wherein the elevation decreases in height from the highest point to the pressure side.

19. The airfoil array segment as recited in claim 18 wherein the elevation decreases in height from the highest point to the suction side.

20. The airfoil array segment as recited in claim 18 wherein the highest point is spaced apart from the suction side so that the elevation decreases in height from the highest point to the suction side and to the pressure side.

* * * * *